(12) United States Patent
Noda

(10) Patent No.: US 10,397,421 B2
(45) Date of Patent: Aug. 27, 2019

(54) IMAGE FORMING DEVICE, IMAGE FORMING SYSTEM, AND COMPUTER-READABLE NON-TRANSITORY STORAGE MEDIUM STORING CONTROL PROGRAM EXECUTED BY COMPUTER FOR CONTROLLING ADDITIONAL PRINTING

(71) Applicant: KONICA MINOLTA, INC., Chiyoda-ku, Tokyo (JP)

(72) Inventor: Yoriko Noda, Tokyo (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/726,758

(22) Filed: Oct. 6, 2017

(65) Prior Publication Data
US 2018/0115656 A1    Apr. 26, 2018

(30) Foreign Application Priority Data
Oct. 21, 2016   (JP) .................. 2016-206733

(51) Int. Cl.
*H04N 1/00* (2006.01)
*G06F 3/12* (2006.01)
(Continued)

(52) U.S. Cl.
CPC .......... *H04N 1/0066* (2013.01); *B41J 2/2135* (2013.01); *B41J 11/008* (2013.01);
(Continued)

(58) Field of Classification Search
CPC .................................................. H04N 1/0066
(Continued)

(56) References Cited

U.S. PATENT DOCUMENTS 4,932,320 A    6/1990   Brunetti et al.
5,056,430 A *  10/1991  Bayerlein ............... B41F 13/12
                                                  101/181
(Continued)

FOREIGN PATENT DOCUMENTS

CN    1491802 A    4/2004
CN    1915169 A    2/2007
(Continued)

OTHER PUBLICATIONS

The extended European Search Report dated Feb. 27, 2018, by the European Patent Office in corresponding European Application No. 17197288.8. (8 pages).
(Continued)

*Primary Examiner* — Jacky X Zheng
(74) *Attorney, Agent, or Firm* — Buchanan Ingersoll & Rooney PC

(57) ABSTRACT

Provided is an image forming device that performs additional printing, including: an image forming unit that prints an additional image on a transfer medium; a storage that stores information about an alignment image printed on the transfer medium; a reader unit that reads the alignment image printed on the transfer medium on an upstream side of the transfer direction of the transfer medium in the image forming unit; and a control unit that detects and distinguishes multiple alignment images upon reception of reading results from the reader unit. The control unit performs control of storing adjustment information for adjusting the position of the additional image to be formed, according to multiple alignment images, in the storage.

15 Claims, 20 Drawing Sheets

(51) Int. Cl.
*G06K 15/02* (2006.01)
*H04N 1/12* (2006.01)
*B41J 2/21* (2006.01)
*B41J 11/00* (2006.01)
*G03G 15/00* (2006.01)
*B41J 15/04* (2006.01)

(52) U.S. Cl.
CPC ........... *G03G 15/50* (2013.01); *G03G 15/652* (2013.01); *G06F 3/1237* (2013.01); *G06K 15/1806* (2013.01); *H04N 1/00737* (2013.01); *H04N 1/00809* (2013.01); *H04N 1/121* (2013.01); *B41J 15/04* (2013.01); *B41J 2202/21* (2013.01)

(58) Field of Classification Search
USPC ........................................................ 358/1.15
See application file for complete search history.

(56) References Cited

U.S. PATENT DOCUMENTS

| | | | |
|---|---|---|---|
| 5,975,674 | A | 11/1999 | Beauchamp et al. |
| 7,488,107 | B2 | 2/2009 | Tubbs |
| 7,804,619 | B2 | 9/2010 | Kubota |
| 2005/0012050 | A1* | 1/2005 | Shemesh ............. H01J 37/1471 250/491.1 |
| 2005/0174379 | A1* | 8/2005 | Nakazawa ................. B41J 3/60 347/19 |
| 2006/0159480 | A1* | 7/2006 | Mima ........................ B41J 3/60 399/82 |
| 2007/0041508 | A1* | 2/2007 | Tubbs ..................... A61B 6/08 378/207 |

FOREIGN PATENT DOCUMENTS

| | | |
|---|---|---|
| CN | 101003202 A | 7/2007 |
| CN | 101221401 A | 7/2008 |
| DE | 19832892 A1 | 1/2000 |
| JP | 2003-039630 A | 2/2003 |
| JP | 2005-111692 A | 4/2005 |
| JP | 2006-187909 A | 7/2006 |
| JP | 2012-153043 A | 8/2012 |
| JP | 2016-117246 A | 6/2016 |

OTHER PUBLICATIONS

First Office Action dated Mar. 1, 2019, by the Chinese Patent Office in corresponding Chinese Patent Application No. 201710960817.7, and an English Translation of the Office Action. (24 pages).

* cited by examiner

IMAGE FORMING DEVICE, IMAGE FORMING SYSTEM, AND COMPUTER-READABLE NON-TRANSITORY STORAGE MEDIUM STORING CONTROL PROGRAM EXECUTED BY COMPUTER FOR CONTROLLING ADDITIONAL PRINTING

Japanese patent application No. 2016-206733 filed on Oct. 21, 2016 including description, claims, drawings, and abstract the entire disclosure is incorporated herein by reference in its entirety

BACKGROUND

Technological Field

The present invention relates to an image forming device, an image forming system that enable additional printing on a transfer medium printed with the previous image, and a computer-readable non-transitory storage medium that stores a control program executed by a computer that controls additional printing.

Description of the Related Art

Some image forming devices that form images on transfer media involve additional printing in which an additional image is printed on a transfer medium already printed with the previous image. In additional printing, the position of the additional image needs to be aligned with that of the previous image, which requires control such that the additional image is printed in an appropriate position on the transfer medium. For this reason, alignment images (which are sometimes referred to as eye marks, for example) are formed on the transfer medium, which is not yet printed with the additional image, and read, thereby determining the position of the additional image to be formed, depending on the image forming timing and the like.

For example, Japanese Patent Laid-Open No. 2006-187909 suggests a technique in which alignment between the position of a previously printed register mark and the position of an additional register mark to print is performed more than once for an alignment.

In addition, Japanese Patent Laid-Open No. 2005-111692 suggests a technique for correction of a misalignment caused in the event of a shortage of paper and addition of paper that has a different paper extension rate.

Further, Japanese Patent Laid-Open No. 2003-039630 suggests a technique using a pre-printing position detector for detecting print marks, such as previously printed marks, for additional printing.

The techniques disclosed in Japanese Patent Laid-Open Nos. 2005-111692 and 2003-039630 correct a misalignment in positional adjustment due to different sheet extension rate.

To print multiple jobs on a continuous transfer medium or the like, multiple alignment images are printed on the transfer medium in some cases. In additional printing, the position of each alignment image is detected and an additional image is printed based on each detected alignment image. However, multiple alignment images and the corresponding additional image to be formed are not always in the same positional relationship and a different plate is sometimes used; thus, the positional relationship between them may differ depending on each alignment image. Besides, since the alignment images cannot be distinguished from each other to be read upon detection, the problem arises that it is difficult to print the additional image in an appropriate position based on multiple alignment images.

SUMMARY

It is an object of the present invention, which has been made in this background, to provide an image forming device, an image forming system that enable an additional image to be printed in an appropriate position based on multiple alignment images, and a computer-readable non-transitory storage medium that stores a control program executed by a computer that controls additional printing.

To achieve at least one of the abovementioned objects, according to an aspect, an image forming device reflecting one aspect of the present invention is an image forming device that performs additional printing, including:

an image forming unit that prints an additional image on a transfer medium;

a storage that stores information about an alignment image printed on the transfer medium;

a reader unit that reads the alignment image printed on the transfer medium on an upstream side of the image forming unit along the transfer direction of the transfer medium; and a control unit that distinguishes multiple alignment images upon reception of reading results from the reader unit, wherein the control unit performs control of storing adjustment information for adjusting the position of the additional image to be formed, according to multiple alignment images, in the storage.

To achieve at least one of the abovementioned objects, according to an aspect, an image forming system reflecting one aspect of the present invention includes:

a storage that stores information about an alignment image printed on a transfer medium; and a control unit that detects and distinguishes multiple alignment images upon reception of the results of reading of the alignment image printed on the transfer medium on an upstream side of the image forming unit along the transfer direction of the transfer medium, wherein the control unit stores adjustment information for adjusting the position of an additional image to be formed, according to multiple alignment images, in the storage.

To achieve at least one of the abovementioned objects, according to an aspect, a computer-readable non-transitory storage medium storing control program executed by computer for controlling additional printing reflecting one aspect of the present invention, the program causing a computer to perform;

control such that information about an alignment image printed on a transfer medium is stored in a storage;

reading for controlling reading of the alignment image printed on the transfer medium on an upstream side of the image forming unit along the transfer direction of the transfer medium;

judgement for controlling detection and distinguishing of multiple alignment images upon reception of the reading results; and control such that adjustment information for adjusting the position of an additional image to be formed, according to multiple alignment images is stored in the storage

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, an embodiment of the present invention will be described with reference to the drawings. However, the scope of the invention is not limited to the disclosed embodiments.

An embodiment of the present invention will now be described with reference to the attached drawings.

Figure 1:
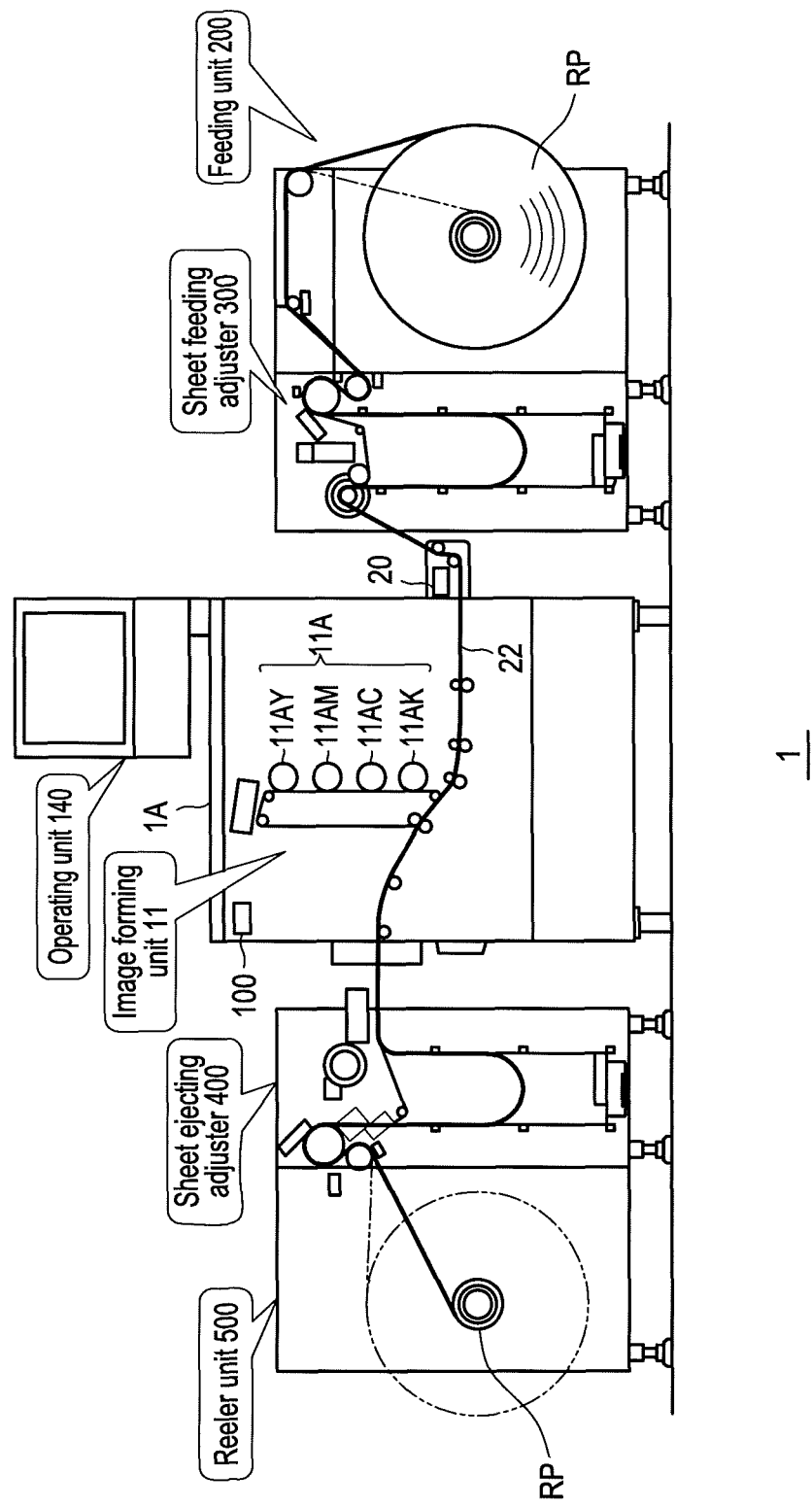
FIG. 1 is a schematic mechanic diagram showing an image forming device of one embodiment of the present invention.

FIG. 1 shows an image forming device according to one embodiment.

An image forming device 1 includes an image forming device body 1A including an image forming unit 11. A sheet feeding adjuster 300 is connected to the upstream side of the image forming device body 1A, and a feeding unit 200 is connected to the upstream side of the sheet feeding adjuster 300. Further, a sheet ejecting adjuster 400 is connected to the sheet ejecting side (the downstream side) of the image forming device body 1A, and a reeler unit 500 is connected to the sheet ejecting side (the downstream side) of the sheet ejecting adjuster 400.

Although the image forming device 1 includes the image forming device body 1A and the devices connected to the image forming device body 1A in this embodiment, there are no limitations on the types and the number of devices connected to the image forming device body 1A and the image forming device can include only the image forming device body 1A. In this case, the image forming device body 1A and other devices can be components of an image forming system.

The feeding unit 200 has a function of containing and holding roll paper RP serving as a continuous transfer medium and feeding it to the downstream device.

The sheet feeding adjuster 300 includes a buffer function for absorbing a small difference between the speeds of the feeding unit 200 and the image forming device body 1A and deviation. The sheet ejecting adjuster 400 includes a buffer function for absorbing a small difference between the speeds of the image forming device body 1A and the reeler unit 500 and deviation. It should be noted that a cutting unit for cutting roll paper RP can be provided between, for example, the image forming device body 1A and the reeler unit 500 and cutting can be performed off-line by the cutting unit. The reeler unit 500 has a function of reeling and holding ejected roll paper.

Although this embodiment uses roll paper as a continuous transfer medium, the continuous transfer medium is not limited to roll paper and can be any transfer medium that is continuous. The continuous transfer medium includes continuous slip paper, continuous form paper, and the like. The continuous transfer medium can be provided in the form of a roll or folded alternately. Further, a continuous transfer medium is not necessarily paper and can be a cloth or film, for example. Further, in the present invention, a medium for printing is not limited to a continuous transfer medium and can be a sheet-like transfer medium.

The image forming device body 1A includes a reader unit 20 for reading alignment images formed on the roll paper RP at the inlet of the housing. The reader unit 20 can read images along the full width or partial width of the roll paper RP. In this case, the reader unit 20 is installed in a position aligned with the region to be read. Further, the reader unit 20 can be a unit that is movable in the width direction of the roll paper RP and can be fixed to an appropriate position, or a unit that can be positioned with adjustment along the transfer direction. The reader unit 20 can include a CCD, a CIS, or the like. The reader unit 20 is controlled by a control unit that controls the overall image forming device and the reading results are transmitted to the control unit, which will be described later.

The image forming device 1 includes, in the image forming device body 1A, the image forming unit 11 for forming images on the roll paper RP. An operating unit 140 for receiving operations by the operator and displaying information is provided above the housing of the image forming device body 1A. Accordingly, the operating unit 140 also serves as a display. The operating unit 140 can separately include an operating unit for operation and a display for display, or can be a touch-screen LCD or any other unit in which an operating unit and a display are integral with each other.

The image forming device 1 includes a transfer path 22 passing from the feeding unit 200 to the sheet feeding adjuster 300, reaching the image forming unit 11, and then passing from the image forming unit 11 to the sheet ejecting adjuster 400 and then to the reeler unit 500. The roll paper RP contained in the feeding unit 200 is fed to the transfer path 22.

In this embodiment, a transfer unit includes the transfer path 22, a transfer roller, a motor (not shown in the drawing) for driving the roller by rotation, and the like.

The image forming unit 11 includes photoreceptor drums 11AY (for yellow), 11AM (for magenta), 11AC (for cyan), and 11AK (for black) (collectively referred to as photoreceptor drum 11A) prepared for the respective colors (e.g., cyan, magenta, yellow, and black), and a charger, a writing unit, and a developing unit (which are not shown in the drawing) are disposed at the edge of each photoreceptor drum 11A. A writing unit including a laser diode (LD) or the like performs image exposure on the surfaces of the photoreceptor drums 11A charged by the charger, according to image data of a document stored in an image memory or the like, thereby forming a latent image on the surfaces of the photoreceptor drums. The latent image becomes a toner image after development in the developing unit. The toner image is transferred to a midpoint transfer belt, and the image on the midpoint transfer belt is transferred to the roll paper RP carried along the transfer path 22. The photoreceptor drums 11A and the midpoint transfer belt correspond to image supporting members.

Although as the present invention, the color image forming device has been described which includes the photoreceptor drums for the respective colors and the midpoint transfer belt, the image forming device can be a monochrome image forming device in the present invention.

After image transfer in the image forming unit 11, the image fixed on the roll paper RP by heat and pressure is ejected from the image forming device body 1A as the roll paper RP is carried.

It should be noted that the image forming device body 1A includes a control unit 100 for controlling the overall image forming device 1. The control unit 100 can include a CPU, a program executed by the CPU, a storage, and the like. A hardware in the control unit 100 corresponds to a computer in the present invention and a program executed in the computer includes a control program in the present invention. The control unit 100 controls an additional image to print on the roll paper RP, detects the alignment images according to the reading results from the reader unit, and distinguishes multiple alignment images. Further, adjustment information for adjusting the positions of the additional images related to multiple alignment images is stored in a storage, and, during additional printing, the positions of the additional images can be determined upon detection of the alignment images, taking the adjustment information into consideration. It should be noted that the alignment images can be detected by the reader unit and the results can be received by the control unit 100.

Figure 2:
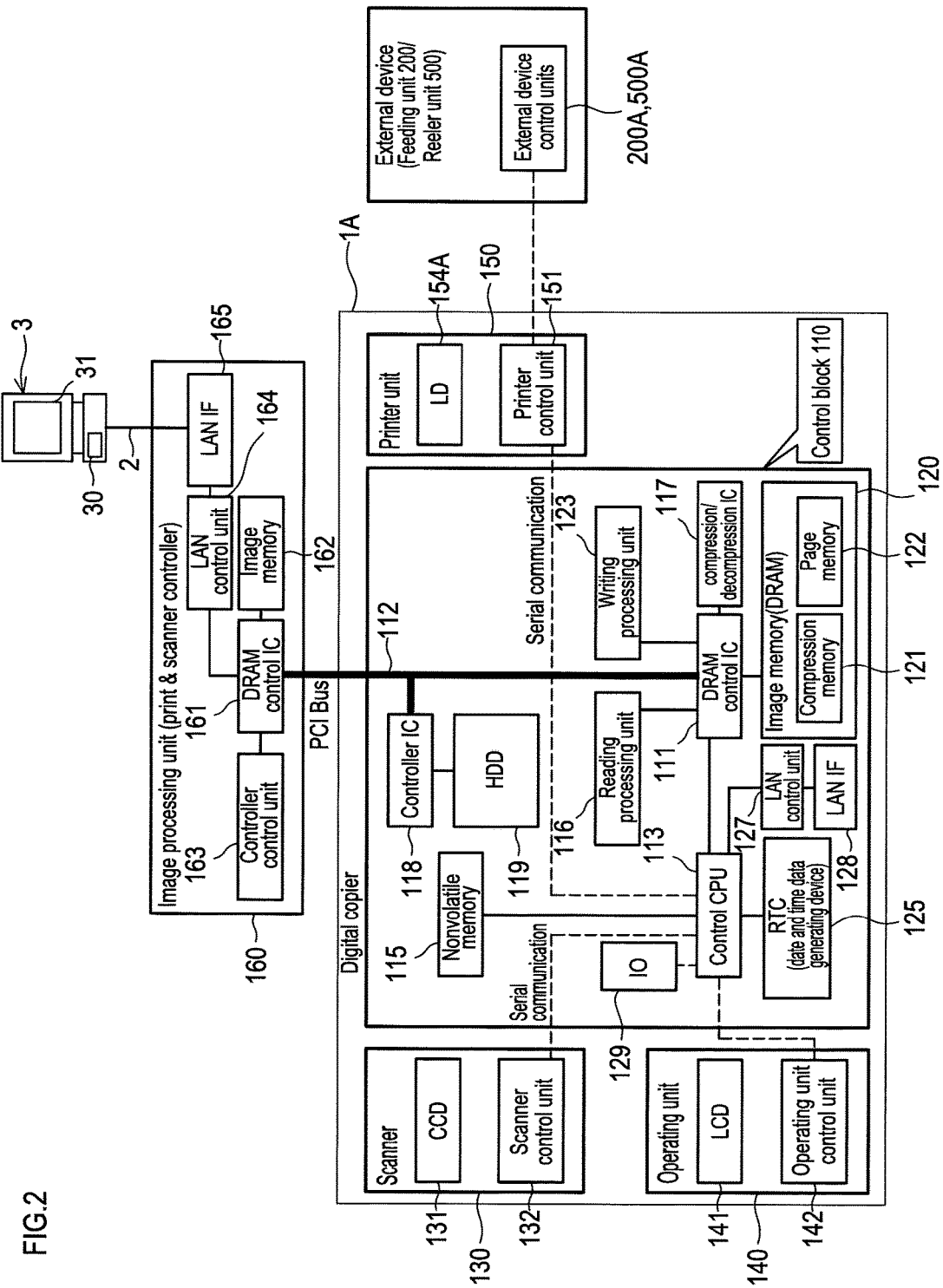
FIG. 2 is similarly a diagram of a control block of the image forming device.

The functions of the image forming device 1 will now be described with reference to the block diagram of FIG. 2.

The image forming device 1 mainly includes a digital copier including a control block 110, a scanner 130, an operating unit 140, and a printer unit 150; and an image processing unit (print & scanner controller) 160 for processing image data input/output to/from an external device 3 via a network 2.

The control block 110 includes a PCI bus 112. The PCI bus 112 is connected to a DRAM control IC 111 in the control block 110. Further, the PCI bus 112 is connected to an HDD 119 through a controller IC 118. The HDD 119 can store image data, for example.

In addition, the control block 110 includes a control CPU 113. The control CPU 113 is connected to the DRAM control IC 111. Further, the control CPU 113 is connected to a nonvolatile memory 115. The nonvolatile memory 115 stores a program executed by the control CPU 113, data of settings in the image forming device 1, process control parameters, data (shape, size, color) for distinguishing read images, for example. In addition, the nonvolatile memory 115 can store information about alignment images, adjustment information for positional adjustment of additional images related to alignment images, for example. In this case, the nonvolatile memory 115 corresponds to a storage of the present invention.

The control CPU 113 controls the overall image forming device 1 by executing a program, grabs the state of the overall image forming device 1, controls the conveyance of the roll paper, and controls image formation. In particular, the control CPU 113 and the program executed by the control CPU 113 serve as the control unit 100 of the present invention. The program includes a control program of the present invention. The hardware of the control CPU 113 corresponds to the computer of the present invention. The control CPU 113 determines, in additional printing, the positions of the additional images, according to the detection of the alignment images, thereby performing additional printing. In additional printing, the image to be additionally printed is formed in a predetermined timing relative to the timing of the detection of the alignment images, thereby determining the positions of the alignment images. It should be noted that adjustment information can be referred for determining the positions of the alignment images.

Further, the control CPU 113 is connected to an RTC (date and time data generating device) 125, so that date and time data can be transmitted to the control CPU 113.

Further, the control CPU 113 is connected to an IO unit 129. The IO unit 129 serves as an interface for information communication between each unit in the image forming device 1 and the control CPU 113. For example, communication between the control CPU 113 and the reader unit 20 that is provided in the path of the image forming device 1 and reads the alignment images on the roll paper can be provided through the IO unit 129.

The scanner 130 includes a CCD 131 that performs optical reading, and a scanner control unit 132 that controls the overall scanner 130. The scanner control unit 132 is connected to the control CPU 113 such that they can serially communicate with each other, and is controlled by the control CPU 113. It should be noted that the scanner control unit 132 can include a CPU, a program for operating the CPU, and the like. The image data read by the CCD 131 undergoes data processing in the reading processing unit 116. The reading processing unit 116 is connected to the DRAM control IC 111.

The operating unit 140 includes a touch screen LCD 141 and an operating unit control unit 142. The LCD 141 and the operating unit control unit 142 are connected to each other. The operating unit control unit 142 and the control CPU 113 are connected to each other such that they can serially communicate with each other. With this configuration, the operating unit 140 is controlled by the control CPU 113. It should be noted that the operating unit control unit 142 can include a CPU, a program for operating the CPU, and the like.

The operating unit 140 makes various settings for the image forming device body 1A and the feeding unit 200, and the control unit controls image formation and the conveyance of the roll paper in accordance with the settings.

The operating unit 140 allows input of settings for the image forming device 1 and operation control conditions, such as operation commands, and display of the settings, the machine state, information and the like, and is controlled by the control CPU 113. This operating unit 140 allows predetermined operations. For example, it allows input of the setting of the additional printing mode executed by the control CPU 113, the setting of the adjustment value for the additional image to print, settings for the alignment images, and the like. In addition, it can give alarm display in the event of alarm. In this case, the operating unit 140 functions as a display of the present invention.

The DRAM control IC 111 is connected to an image memory 120 including a compression memory 121 and a page memory 122. The image memory 120 stores image data acquired by the scanner 130 and image data acquired through the network 2. As described above, the image memory 120 is a storage area for image data and stores the image data of a job to print. In addition, the DRAM control IC 111 can make the image memory 120 store image data related to multiple jobs. To be specific, the image memory 120 can store information about reserved jobs. Further, image data and job information can also be stored in the HDD 119. Job information can be stored, being associated with adjustment information. Information about the alignment images and adjustment information for adjusting the positions of additional images to be formed in additional printing can be stored in the image memory 120 and the HDD 119. In this case, the image memory 120 and the HDD 119 storing adjustment information about the alignment images correspond to a storage of the present invention. It should be noted that information about the alignment images and adjustment information can be stored in different storage media.

The DRAM control IC 111 is connected to a compression/decompression IC 117 that can compress image data or decompress the compressed data. The DRAM control IC 111 is connected to a writing processing unit 123. The writing processing unit 123 is connected to an LD 154A of the printer unit 150 and performs processing of data used for the operation of the LD 154A. The LD 154A is the collective name of the LDs for the respective colors. Further, the printer unit 150 controls a transfer unit including the image forming unit 11 and the transfer path 22.

The printer unit 150 includes a printer control unit 151 that controls the overall printer unit 150. The printer control unit 151 is connected to and controlled by the control CPU 113. In particular, a print operation is started or stopped according to the parameters given by the control CPU 113. The printer control unit 151 is controllably connected to external device control units 200A and 500A that control the feeding unit 200 and the reeler unit 500, and a command from the control CPU 113 can control the conveyance and reeling of the roll paper through the printer control unit 151.

Further, the PCI bus 112 connected to the DRAM control IC 111 is connected to a DRAM control IC 161 of the image processing unit (print & scanner controller) 160. In the image processing unit (print & scanner controller) 160, the DRAM control IC 161 is connected to an image memory 162. Further, in the image processing unit (print & scanner controller) 160, the DRAM control IC 161 is connected to a controller control unit 163, and the DRAM control IC 161 is connected to a LAN control unit 164 and a LAN interface 165. The LAN interface 165 is connected to the network 2.

The external device 3 is connected to the network 2 and can transmit/receive image data to/from the image forming device 1.

The external device 3 can be used as a device serving as a terminal or a device for managing the image forming device. The external device 3 includes an external device control unit 30. The external device 3 can be entirely controlled by the operation of the external device control unit 30. Further, when the external device 3 controls the image forming device, the external device control unit 30 functions as a control unit of the present invention. The external device control unit 30 can include a CPU, a program for operating the CPU, a storage, and the like. In this case, the external device control unit 30 can function as an image forming system for managing the image forming device. The external device 3 further includes an external device operating unit 31 through which alignment images can be stored in the storage, adjustment information can be input, and alarm can be displayed, for example. The storage can be included in the external device 3, the image forming device 1, or any other external device. For a display operation, it functions as a display of the present invention. It should be noted that the display operation can be controlled such that the display operation is performed on the operating unit 140 of the image forming device 1. The network 2 can be used as a WAN instead of a LAN.

The management device can directly control the image forming device or instruct the image forming device to operate according to control so that the image forming device can operate according to the instruction.

Further, a LAN control unit 127 and a LAN interface 128 are connected to the control CPU 113. The LAN interface 128 can be connected to the network 2 or any other network, for example. The network 2 is connected to the external device 3 and the like.

The basic operation of the image forming device 1 will now be explained.

First, a process for accumulating image data in the image forming device 1 will be explained. When the image of a document is read by the scanner 130 to generate image data, the scanner 130 optically reads the image of the document from the document by using the CCD 131. At this time, the scanner control unit 132 receiving an instruction from the control CPU 113 controls the operation of the CCD 131. The image read by the CCD 131 is subjected to data processing in the reading processing unit 116. The image data after data processing is compressed in the compression/decompression IC 117 with a predetermined scheme, and then stored in the compression memory 121 and the HDD 119 through the DRAM control IC 111. The image data stored in the compression memory 121 and the HDD 119 can be managed by the control CPU 113 as a job.

When image data is acquired from an external device, image data transmitted from the external device 3 via the network 2, for example, is stored in the image memory 162 by the act of the DRAM control IC 161 controlled by the controller control unit 163 through the LAN interface 165 and the LAN control unit 164. The data in the image memory 162 is temporarily stored in the page memory 122 through the DRAM control IC 161, the PCI bus 112, and the DRAM control IC 111. The data stored in the page memory 122 is sequentially transmitted to the compression/decompression IC 117 via the DRAM control IC 111 to be subjected to compression, is stored in the compression memory 121 and the HDD 119 via the DRAM control IC 111, and is managed by the control CPU 113 in a manner similar to that described above. Further, image data can be acquired through a USB memory or the like.

When the image forming device 1 outputs an image, i.e., when it is used as a copier or printer, image data stored in the compression memory 121 and the HDD 119 is transmitted to the compression/decompression IC 117 through the DRAM control IC 111 and then decompressed. The decompressed image data is repeatedly decompressed by the writing processing unit 123 into the LD 154A, so that the roll paper RP can be printed with the image data.

When it is used as a copier, information about the printing conditions (print mode) and the like set on the operating unit 140 is notified to the control CPU 113 where setting information is then generated. Generated setting information can be stored in the RAM of the control CPU 113. Generation of mark images, designation of normal printing, and designation of additional printing are also performed here.

When it is used as a printer, the printing conditions can be set with the printer driver in the external device 3. Similarly to images, the printing conditions set here are stored in the external device 3, the LAN IF 165, the image memory 162, the DRAM control IC 161 (controller), the DRAM control IC 111 (body), and the page memory 122, in this order.

In the printer unit 150, the printer control unit 151 receiving an instruction from the image control CPU 113 controls the units.

When the image forming device 1 outputs images, the printing conditions are set in ticket edition through the operating unit 140. With these settings, the control CPU 113 controls printing. In additional printing, the positions of additional images to be formed are determined upon timing setting, according to the detected alignment images.

In the image forming unit 11, the toner image on each photoreceptor drum 11A is transferred to the midpoint transfer belt, then transferred, with the secondary transfer roller, to the roll paper RP provided from the feeding unit 200, and then fixed by a fuser. A sheet on which an image has been formed is conveyed to the sheet ejecting adjuster 400 along the transfer path 22, and then reeled and held by the roller of the downstream side reeler unit 500. When multiple reserved jobs exist, the above-described image output is performed in sequence according to the set order.

Figure 3:
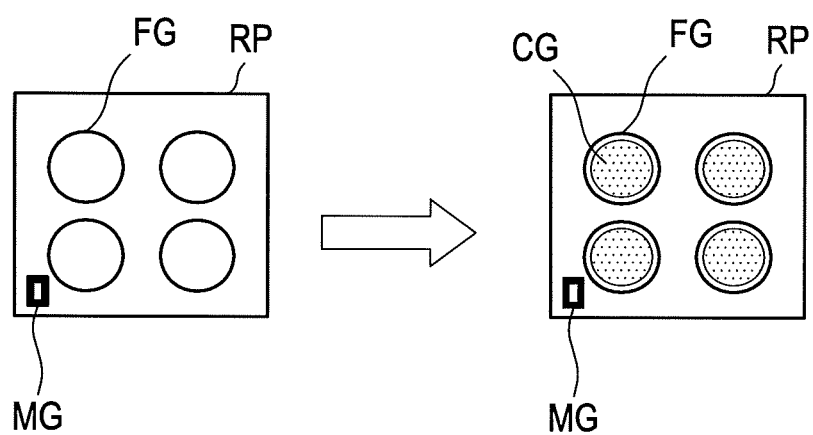
FIG. 3 is a diagram for explaining the state where additional images are printed on a transfer medium printed with alignment images and previous images, in a superimposed manner.

FIG. 3 shows an image of additional printing performed with the image forming device 1.

In the left diagram of FIG. 3, multiple previous images FG, such as lame portions, are arranged on the roll paper RP in parallel in the width direction at intervals. On the page on which the previous images FG are formed, an eye mark MG for alignment is formed as an alignment image. It should be noted that an alignment image can be printed on a transfer medium along with previous images. Alternatively, an alignment image can be printed on a transfer medium already printed with previous images, for use in additional printing. Further, an alignment image can be a sign, code, letter, or the like.

The right diagram of FIG. 3 shows the state where additional images CG are printed. In additional printing of this example, additional images CG are superimposed on the previous images FG, thereby obtaining finished images after additional printing. Accordingly, if the positions of the additional images deviate, the qualities of the finished images dramatically decrease.

It should be noted that, in additional printing, the eye mark MG is detected and the additional images CG are then printed in the same predetermined timing. The predetermined timing is determined in advance.

Even if the additional images are printed in a timing determined in advance, they may deviate from a predetermined margin even by litho-printing of the alignment image and the previous images, so that the additional images are not disposed in appropriate positions relative to the previous images in some cases. Accordingly, for example, manual resist adjustment (superimposing synchronization) is needed before printing a job. In manual adjustment, the eye mark is read, the positions of the additional images to be formed are determined in a timing of a predetermined set value, and the additional images are printed. The resulting print is checked to grab the amount of deviation and adjustment information is manually set and then stored in a storage. In adjustment, the additional images can be printed and checked again in a timing after adjustment. If any deviation is confirmed, adjustment is performed again. In actual additional printing, this adjustment information is read from the storage, the eye mark image is read, timing adjustment is performed based on the adjustment information, the additional images are printed, and superimposing synchronization is performed.

Figure 4:
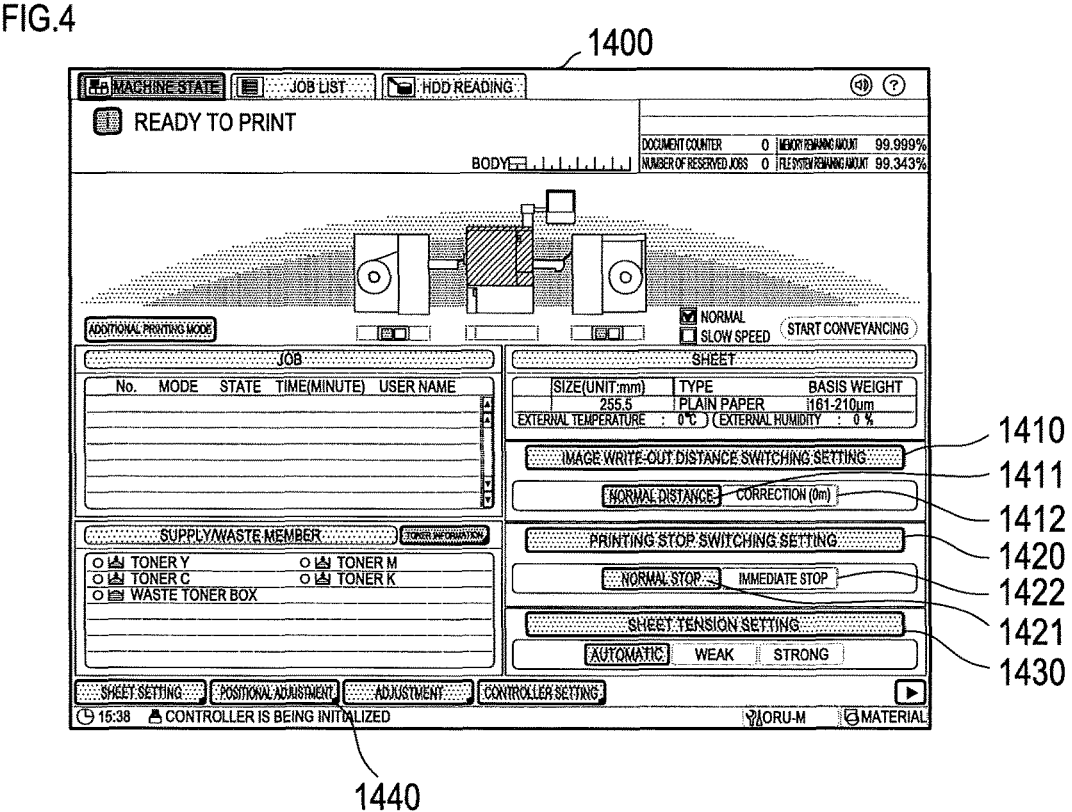
FIG. 4 shows an operating screen in the additional printing mode.

FIG. 4 shows a machine setting screen 1400 in the additional printing mode, displayed on the operating unit 140. This setting screen is provided with an image write-out distance switching setting item 1410. This item shows a normal distance button 1411 and a correction button 1412 in the manner that they can be pressed. When the normal distance button 1411 is selected, an additional image is printed with respect to an alignment image, according to a default value determined in advance. A default value can be acquired through input via the operating unit 140, data reception, job information, and the like. When the correction button 1412 is pressed, the timing of printing an additional image is one corrected from the default value on the basis of adjustment information.

In addition, the machine setting screen 1400 is provided with a printing stop switching setting item 1420. The printing stop switching setting item 1420 is provided with a normal stop button 1421 and an immediate stop button 1422, which can be alternatively selected, in the manner that they can be pressed. In printing stop switching setting, settings are made for a printing stop operation in the event of an accident that requires the stop of printing of a job. When the normal stop button 1421 is pressed, a stop operation is performed upon such an accident, according to a predetermined setting. For example, a pop-up window or the like is displayed on the operating unit 140 such that the user can select stop or continuation. When the immediate stop button 1422 is pressed, printing is immediately stopped upon such an accident. With a sheet tension setting item 1430, the tension to the sheet can be set and selected from automatic, weak, and strong. Adjustment information can be set by pressing a positional adjustment button 1440 provided on the bottom of the screen.

Figure 5:
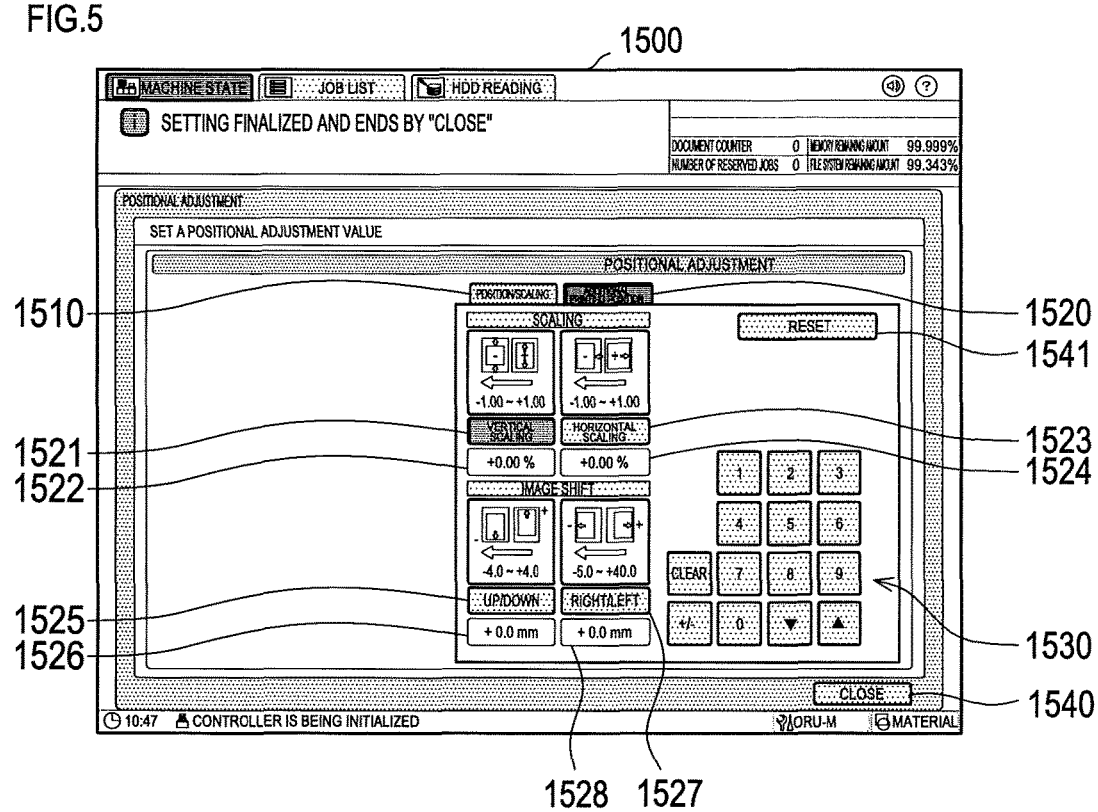
FIG. 5 shows an operating screen to enter a positional adjustment value.

FIG. 5 shows a positional adjustment setting screen 1500 which is displayed when the positional adjustment button 1440 is pressed on the machine setting screen 1400.

The positional adjustment setting screen 1500 includes a position/scaling tab 1510 and an additional printing position tab 1520. Pressing these enable setting of the position/scaling and setting of the additional printing position, respectively. Here, the case where the additional printing position tab 1520 is selected will be described.

In additional printing position setting, a vertical scaling button 1521 and a horizontal scaling button 1523 are displayed in a scaling field in the manner that they can be pressed. When the vertical scaling button 1521 is pressed, the vertical scaling can be set. A numeric value can be entered with a numeric keypad 1530, the set numeric value is displayed in a vertical scaling numeric value field 1522, and the images before and after the scaling change are displayed above the vertical scaling button 1521. When the horizontal scaling button 1523 is pressed, the horizontal scaling can be set. A numeric value can be entered with the numeric keypad 1530, the set numeric value is displayed in a horizontal scaling numeric value field 1524, and the images before and after the scaling change are displayed above the horizontal scaling button 1523.

Further, in additional printing position setting, an up/down button 1525 and a right/left button 1527 are shown in an image shift field in the manner that they can be pressed. When the up/down button 1525 is pressed, the position of an additional image relative to an alignment image can be set. A numeric value can be entered with the numeric keypad 1530, the set numeric value is displayed in a vertical position numeric value field 1526, and the images before and after the vertical shift are displayed above the up/down button 1525. Further, when the right/left button 1527 is pressed, the position of an additional image relative to an alignment image can be set. A numeric value can be entered with the numeric keypad 1530, the set numeric value is displayed in a horizontal position numeric value field 1528, and the images before and after the horizontal shift are displayed above the right/left button 1527.

In additional printing, multiple jobs need to be printed on a continuous transfer medium in some cases.

Figure 6:
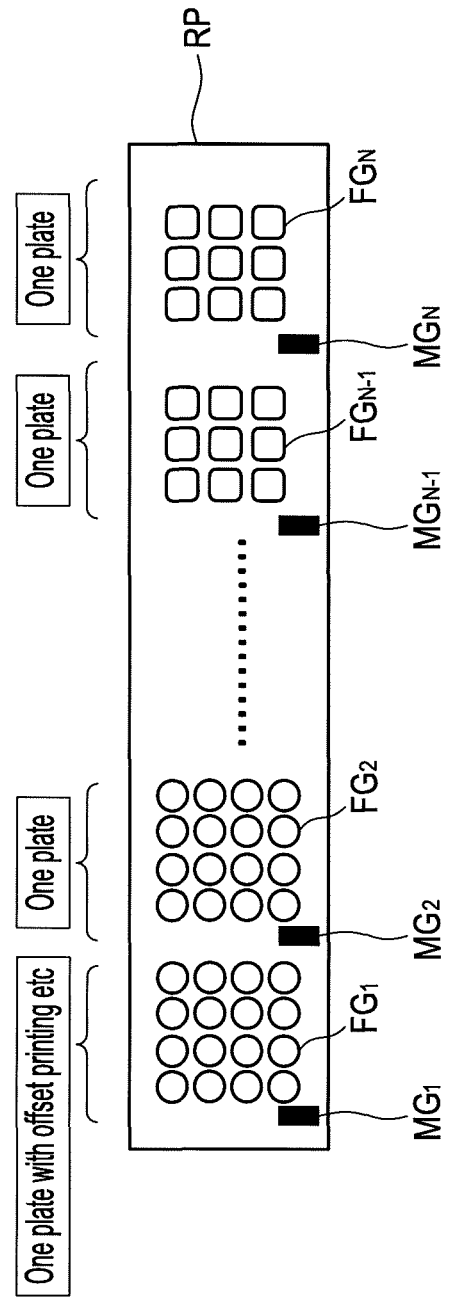
FIG. 6 is a diagram showing a transfer medium printed with alignment images and previous images according to multiple additional printing jobs.

FIG. 6 shows the previous printing state described above. Plates with offset printing or the like thereon are provided one by one in sequence on the roll paper RP. Eye marks $MG_1$ to $MG_N$ and previous images $FG_1$ to $FG_N$ are printed according to the respective plates.

Thus, in the case of additional printing with multiple jobs, adjustment information needs to be acquired for each eye mark. If adjustment is not performed for each eye mark, a difference between eye marks is not recognized during reading. Accordingly, when the eye marks are different, additional printing may be performed in an inappropriate different timing.

Suppose that 150 circles and 100 squares are pre-printed, for example.

Assume that 100 copies of the letter A (JOB 1) and 40 copies of the letter B (JOB 2) should be additionally printed in the circles on a pre-printed sheet, and 90 copies of the letter C (JOB 3) should be additionally printed in the squares. For each job, 10 sets of extra pre-prints are prepared, for example. These are extra pre-prints for resist adjustment, which eventually become waste prints.

Figure 7:
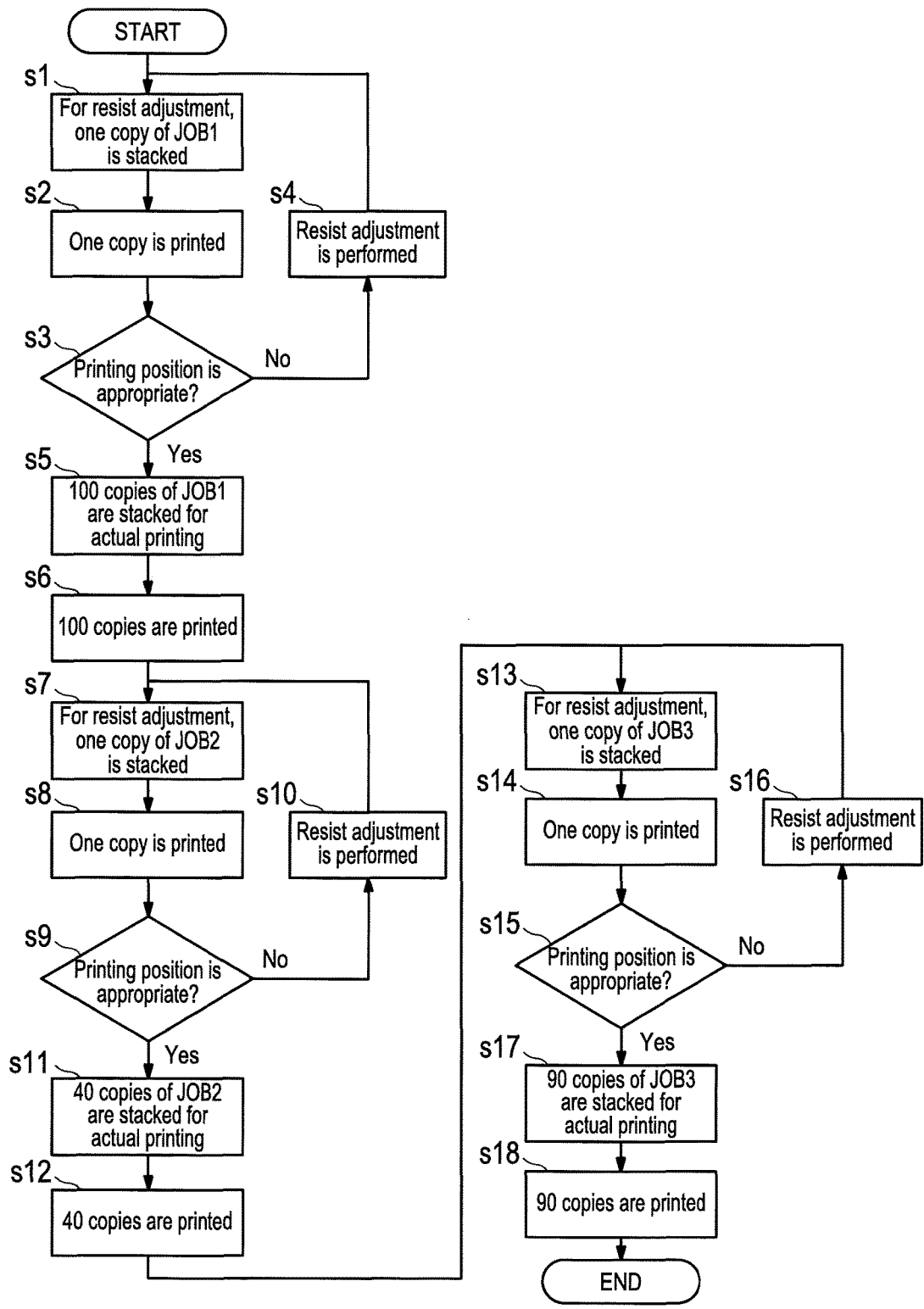
FIG. 7 is a flow chart showing a procedure for printing additional images on the transfer medium shown in FIG. 6.

A procedure for additional imaging on the above-described pre-printed roll paper RP according to multiple jobs will be explained with reference to the flow chart of FIG. 7. It should be noted that the following procedure is executed under control by the control unit.

First, for resist adjustment, one copy of JOB 1 is stacked (Step s1). This means that the job is registered as a reserved job. Next, one copy of JOB 1 is additionally printed (Step s2). In additional printing, the positions of additional images are determined according to detection of alignment images and printed. Whether additional images are placed in appropriate positions on this print is determined (Step s3). If they are not in appropriate positions (Step s3, No), manual resist adjustment is performed (Step s4) and the process returns to Step s1 to perform again a procedure for checking if additional printing is appropriate.

If the printing positions are appropriate according to the determination in Step s3 (Step s3, Yes), 100 copies of JOB 1 are stacked for actual printing (Step s5) and 100 copies are additionally printed (Step s6).

After completion of printing of JOB 1, one copy of JOB 2 is stacked for resist adjustment (Step s7). Next, one copy of JOB 2 is additionally printed (Step s8). In additional printing, the positions of additional images are determined according to detection of alignment images and printed. Whether additional images are placed in appropriate positions on this print is determined (Step s9). If they are not in appropriate positions (Step s9, No), manual resist adjustment is performed (Step s10) and the process returns to Step s7 to perform again a procedure for checking if additional printing is appropriate.

If the printing positions are appropriate according to the determination in Step s9 (Step s9, Yes), 40 copies of JOB 2 are stacked for actual printing (Step s11) and 40 copies are additionally printed (Step s12).

After completion of printing of JOB 2, one copy of JOB 3 is stacked for resist adjustment (Step s13). Next, one copy of JOB 3 is additionally printed (Step s14). In additional printing, the positions of additional images are determined according to detection of alignment images and printed. Whether additional images are placed in appropriate positions on this print is determined (Step s15). If they are not in appropriate positions (Step s15, No), manual resist adjustment is performed (Step s16) and the process returns to Step s13 to perform again a procedure for checking if additional printing is appropriate.

If the printing positions are appropriate according to the determination in Step s15 (Step s15, Yes), 90 copies of JOB 3 are stacked for actual printing (Step s17), 90 copies are additionally printed (Step s18), and the process terminates.

As described above, resist adjustment is inevitably needed each time before actual printing of JOB 1, JOB 2, and JOB 3. Since resist adjustment is needed each time, jobs cannot be stacked continuously and the user cannot leave the place.

Besides, pre-printing for resist adjustment is performed with 10 copies for circles and 10 copies for squares, so that only 10 copies are allowed for adjustment of JOBS 1 and 2 that require additional printing to the circles. Further, the problem arises that, if 10 or more copies are used for resist adjustment for JOBS 1 and 2, printing 100 copies in JOB 1 and 40 copies in JOB 2 in actual printing leaves JOB 2 printed in the squares.

When multiple jobs are additionally printed on a continuous transfer medium as described above, the above-described method is not efficient.

Further, according to the specifications in the present situation, to prevent errors, one setting related to alignment images disables continuous jobs. Many procedure steps are required even for small lot printing.

In this embodiment, in additional printing on a continuous transfer medium according to multiple jobs, multiple alignment images can be distinguished and the positions of additional images can be adjusted for each job. For example, the eye marks can be blue or red. Thus, they are distinguished by multiple characteristics such as color, size, and shape, and are selected or read with a scanner or the like so that information about the eye marks are recognized, the respective eye marks can be registered, and resist adjustment registration are allowed for the respective eye marks. In addition, even if multiple jobs are present on one roll of continuous sheet of paper, association between jobs and eye marks allows multiple jobs to be continuously printed at once after resist adjustment is first performed.

Suppose that the following pre-printed sheets exist, for example.

Sheets for resist adjustment: five circles of an eye mark 1, five circles of an eye mark 2, and 10 squares of an eye mark 3

Sheets for actual printing: 100 circles of the eye mark 1, 40 circles of the eye mark 2, and 90 squares of the eye mark 3

Alternatively, sheets are not necessarily separated. An advantage of separating sheets for adjustment and those for actual printing is to prevent waste prints for resist adjustment from being mixed into actual printing, thereby achieving clarity.

Figure 8:
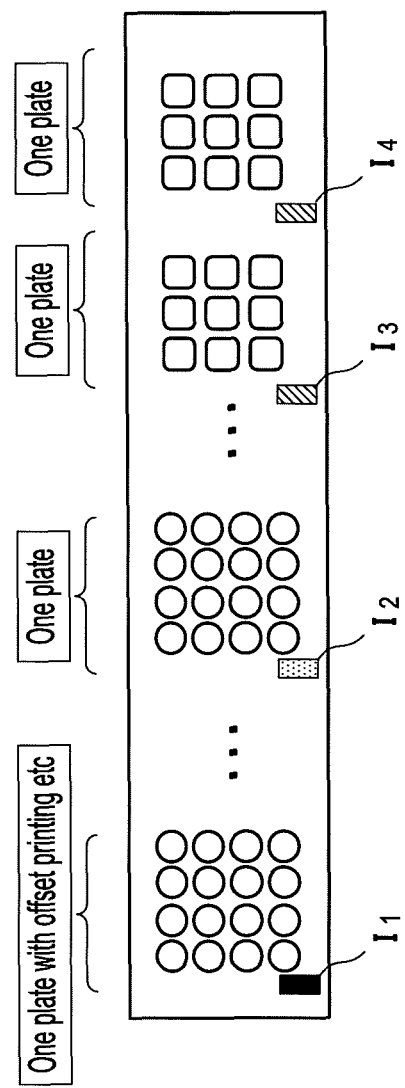
FIG. 8 is a diagram showing a transfer medium printed with multiple eye marks and previous images, which is used in one embodiment of the present invention.

Assume that, as shown in FIG. 8, 100 copies of the letter A (JOB 1) and 40 copies of the letter B (JOB 2) should be additionally printed in the circles, and 90 copies of the letter C (JOB 3) should be additionally printed in the squares on these pre-printed sheets in actual printing.

Sheets for resist adjustment are first set and resist values are registered for the respective eye marks of JOBS 1, 2, and 3.

JOB 1 is associated with an eye mark I1, JOB 2 is associated with an eye mark I2, and JOB 3 is associated with an eye mark I3.

This allows settings to be made at once and jobs can be stacked in a row although conventionally, resist adjustment is needed each time printing is performed. Thus, the user can leave the place during actual printing.

Further, parts used for resist adjustment (i.e., waste prints) are not mixed in the middle, so that the works can be directly brought to the next step.

In addition, association between a JOB and an eye mark allows a registered resist value to be recalled each time. Thus, when this JOB should be printed next time, resist adjustment is unnecessary.

Moreover, when an eye mark I4 and the eye mark I3 are of the same type (e.g., color, shape, and size), this job can be associated with the eye mark I3.

Figure 9:
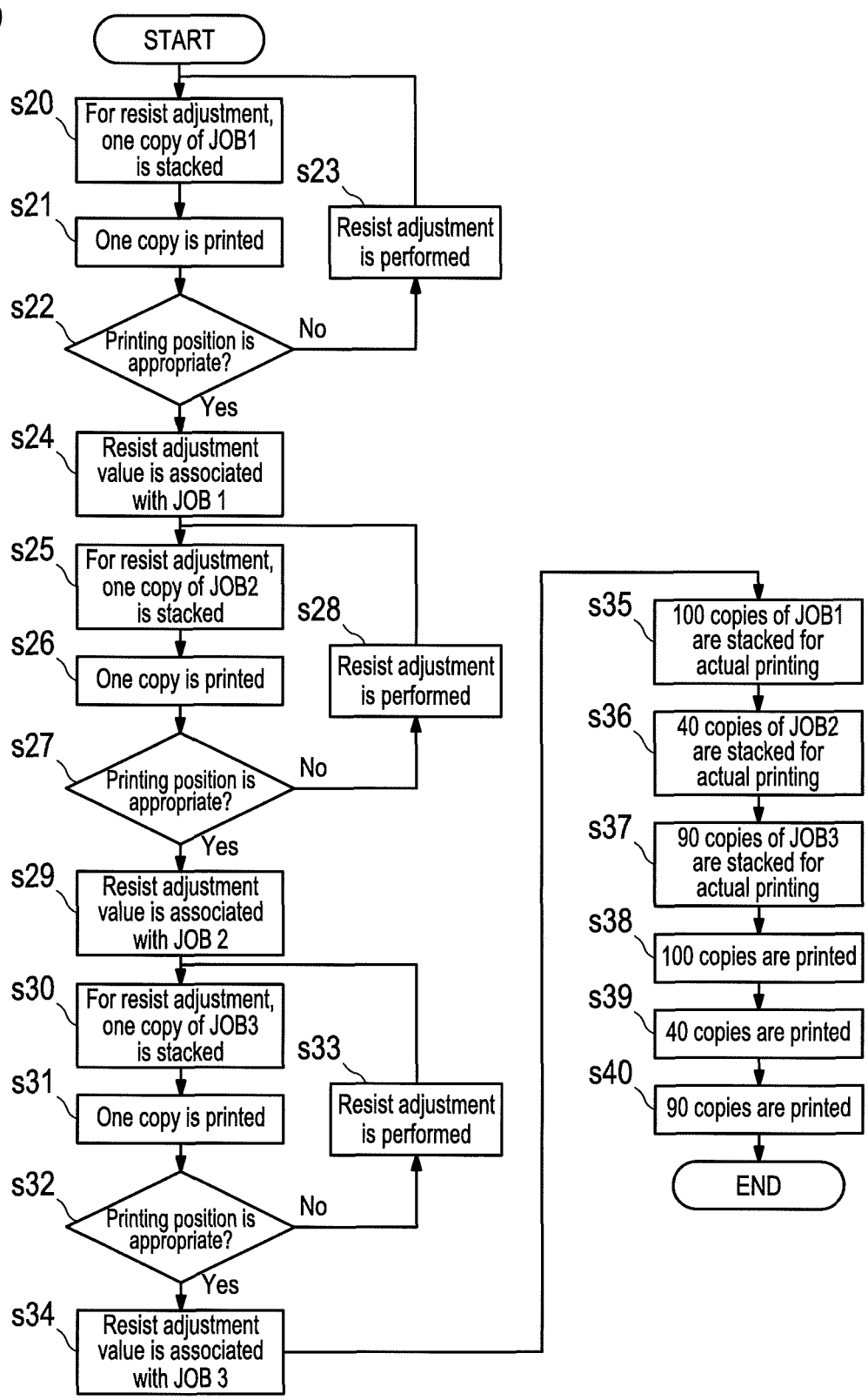
FIG. 9 is similarly a flow chart showing a procedure for printing additional images on a transfer medium printed with multiple eye marks and previous images.

A procedure for positional adjustment and actual printing for the above-described additional printing will now be explained with reference to the flow chart of FIG. 9. It should be noted that the following procedure is executed under control by the control unit.

First, for resist adjustment, one copy of JOB 1 is stacked (Step s20). One copy of JOB 1 is then additionally printed (Step s21), and whether additional images are placed in appropriate positions is determined (Step s22). If they are not in appropriate positions (Step s22, No), manual resist adjustment is performed (Step s23) and the process returns to Step s20 to perform again a procedure for checking if additional printing is appropriate.

If the printing positions are appropriate according to the determination in Step s22 (Step s22, Yes), a resist adjustment value, i.e., adjustment information is associated with JOB 1 and stored in a storage (Step s24).

Next, for resist adjustment, one copy of JOB 2 is stacked (Step s25). One copy of JOB 2 is then additionally printed (Step s26), and whether additional images are placed in appropriate positions is determined (Step s27). If they are not in appropriate positions (Step s27, No), manual resist adjustment is performed (Step s28) and the process returns to Step s25 to perform again a procedure for checking if additional printing is appropriate.

If the printing positions are appropriate according to the determination in Step s27 (Step s27, Yes), a resist adjustment value, i.e., adjustment information is associated with JOB 2 and stored in a storage (Step s29).

Next, for resist adjustment, one copy of JOB 3 is stacked (Step s30). One copy of JOB 3 is then additionally printed (Step s31), and whether additional images are placed in appropriate positions is determined (Step s32). If they are not in appropriate positions (Step s32, No), manual resist adjustment is performed (Step s33) and the process returns to Step s30 to perform again a procedure for checking if additional printing is appropriate.

If the printing positions are appropriate according to the determination in Step s32 (Step s32, Yes), a resist adjustment value, i.e., adjustment information is associated with JOB 3 and stored in a storage (Step s34).

Adjustment information for each job is stored in the storage, and the process proceeds to actual printing.

First, for actual printing, 100 copies of JOB 1 are stacked (Step s35), 40 copies of JOB 2 are stacked (Step s36), and 90 copies of JOB 3 are stacked (Step s37). As for reserved jobs, jobs are reserved in the order of printing. Next, adjustment information of JOB 1 stored in the storage is read and 100 copies of JOB 1 are additionally printed according to this adjustment information (Step s38). Next, adjustment information of JOB 2 stored in the storage is read and 40 copies of JOB 2 are additionally printed according to this adjustment information (Step s39). Next, adjustment information of JOB 3 stored in the storage is read, 90 copies of JOB 3 are additionally printed according to this adjustment information (Step s40), and the additional printing process is terminated.

With the above-described procedure, a sequence of jobs can be actually-printed on one continuous transfer medium, so that the user can leave the place during actual printing without any problem. Further, waste prints and actual printed portions are clearly separated.

The above-described procedure involves steps for registering adjustment information to a storage, and although automatic association with an eye mark can be performed, association can be performed in ticket edition for a job instead.

Figure 10:
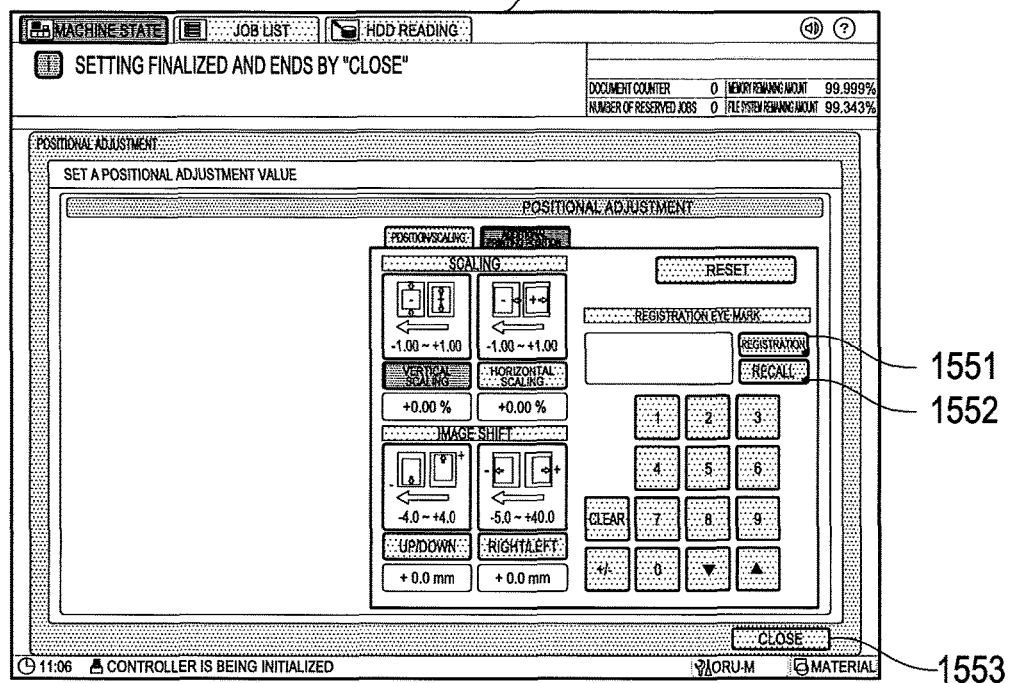
FIG. 10 similarly shows an operating screen to register an eye mark with an adjustment value.
Figure 11:
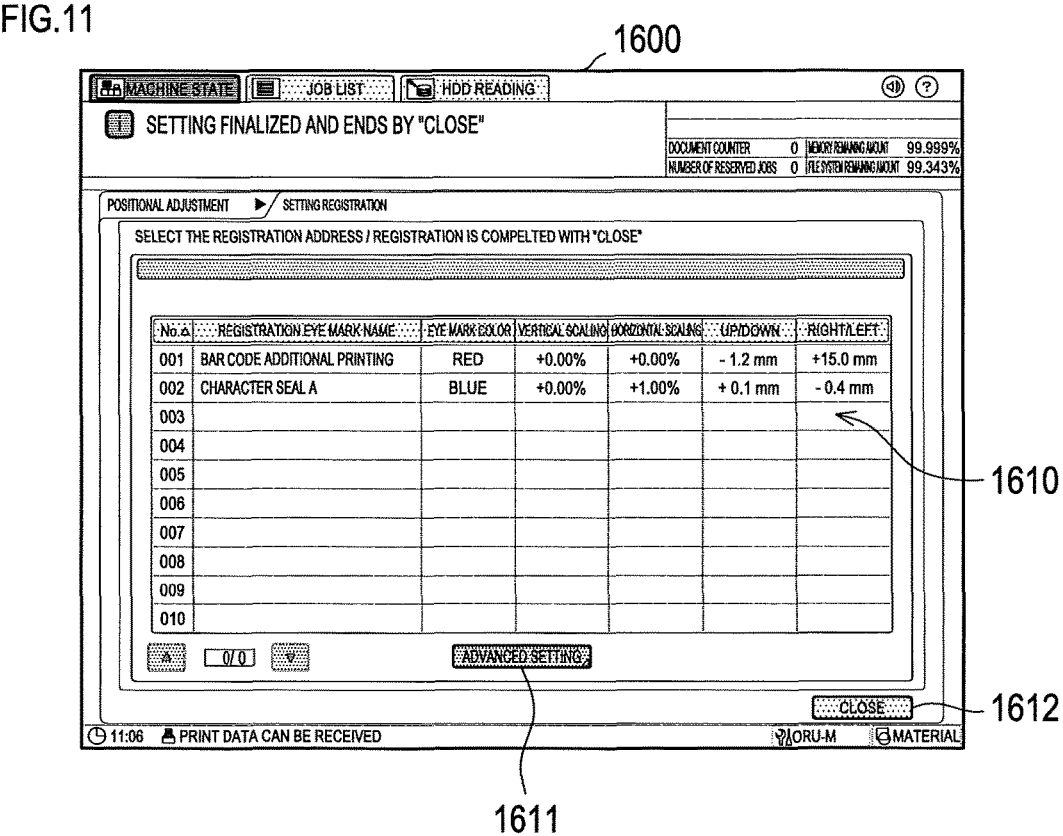
FIG. 11 similarly shows an operating screen showing a list of eye mark information to be registered being associated with adjustment information.

FIG. 10 is a screen similar to the positional adjustment setting screen shown in FIG. 5 and shows a positional adjustment setting screen 1550 provided with setting items for registering eye marks to be associated with adjustment information. On this screen, eye marks to be associated with adjustment information are registered. For registration, a registration button 1551 or a recall button 1552 is included. Pressing the registration button 1551 calls up the screen of a registration address list of multiple registration regions (FIG. 11). Pressing a close button 1553 confirms the settings, terminates setting work, and closes the positional adjustment setting screen 1550. If a registration eye mark is set, adjustment information and an eye mark is associated with each other and stored in the storage.

Figure 12:
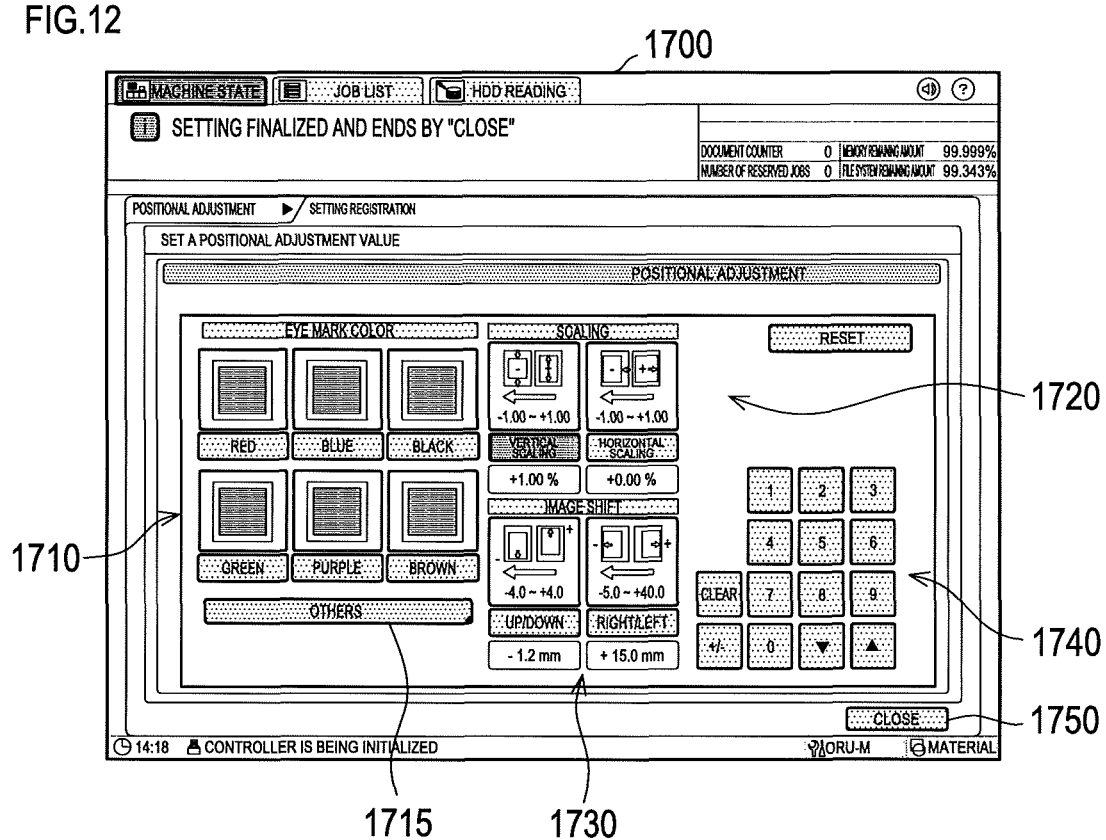
FIG. 12 shows an operating screen to set the details of eye mark information.

FIG. 11 is an eye mark information list screen 1600 showing a list of registration address eye mark information. Eye mark information is registered in advance and an eye mark list 1610 shows information. Selecting a registration field and pressing an advanced setting button 1611 call up an eye mark information registration screen 1700 in an operable state as shown in FIG. 12. Pressing a close button 1612 on the eye mark information list screen 1600 confirms settings, terminates setting work, closes the eye mark information list screen 1600 to return to the original screen, i.e., the positional adjustment setting screen 1550, and displays the selected eye mark as a registration address eye mark.

The eye mark information registration screen 1700 shown in FIG. 12 can be recalled from another operating screen or the like.

On the eye mark information registration screen 1700, advanced settings for eye mark information can be made.

On the eye mark information registration screen 1700, which is provided with an eye mark color selecting button group 1710 for selecting the color of an eye mark, pressing a selected button determines the color of the eye mark. Further, for positional adjustment in additional printing, settings of numeric values of vertical scaling and horizontal scaling can be further made through a scaling button group 1720 and a numeric keypad 1740. Further, for positional adjustment in additional printing, settings of the amounts of vertical and horizontal shifts can be further made through an image shift button group 1730 and the numeric keypad 1740. These settings are registered as adjustment information. Pressing an others button 1715 allows another color to be read through a scanner and registered. Although eye marks are distinguished by color in this embodiment, eye marks can be distinguished by shape, size, or the like, or any combination thereof.

Pressing a close button 1750 confirms settings, terminates setting work, and closes the displayed screen. Although eye mark and adjustment information are stored in the storage in the above description, eye mark information and adjustment information can be separately stored in the storage and associated with each other.

Figure 13:
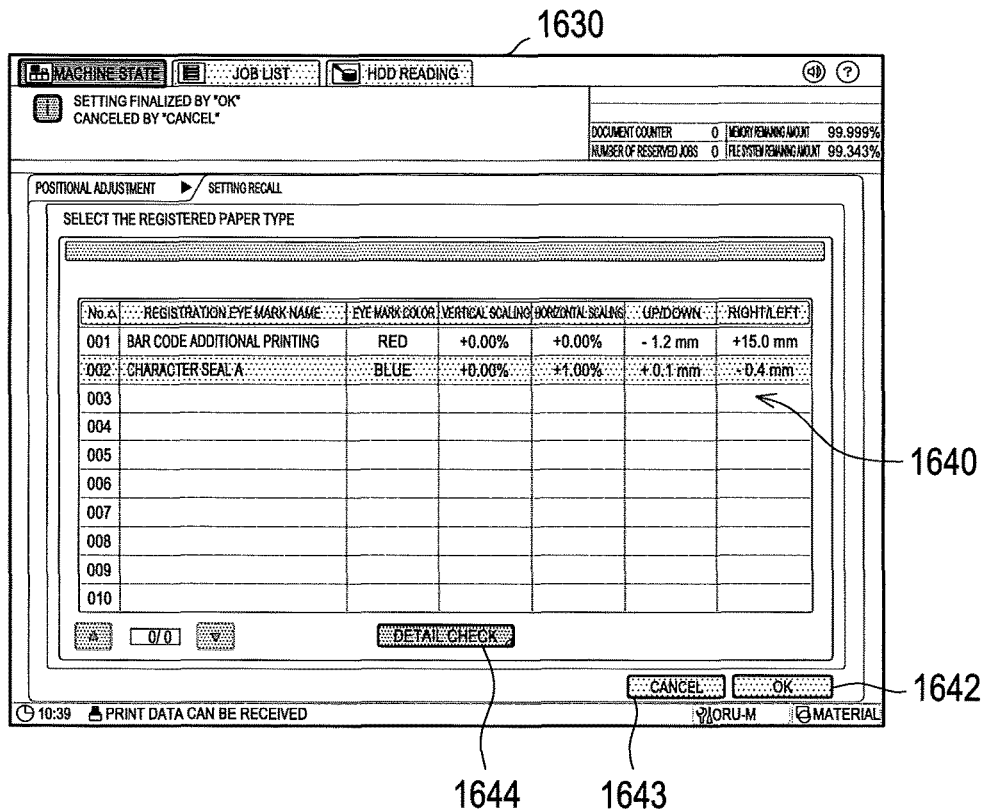
FIG. 13 similarly shows an operating screen showing the registered eye mark information.

Pressing a recall button 1552 on the positional adjustment setting screen 1550 shown in FIG. 10 recalls, as shown in FIG. 13, eye mark information registered without being associated with any job and an eye mark recall screen 1630 is displayed. On the eye mark recall screen 1630, an eye mark registration list 1640 is displayed. Pressing a details check button 1644 displays information about the details of the eye mark. Pressing an OK button 1642 with a registration field selected confirms eye mark recall setting, and pressing a cancel button 1643 cancels setting.

A method of associating adjustment information and a job with each other through ticket edition will now be explained. It should be noted that ticket edition is intended for correction of information about temporarily saved jobs (temporal jobs not stacked on reservation) before they are stacked on reservation.

Figure 14:
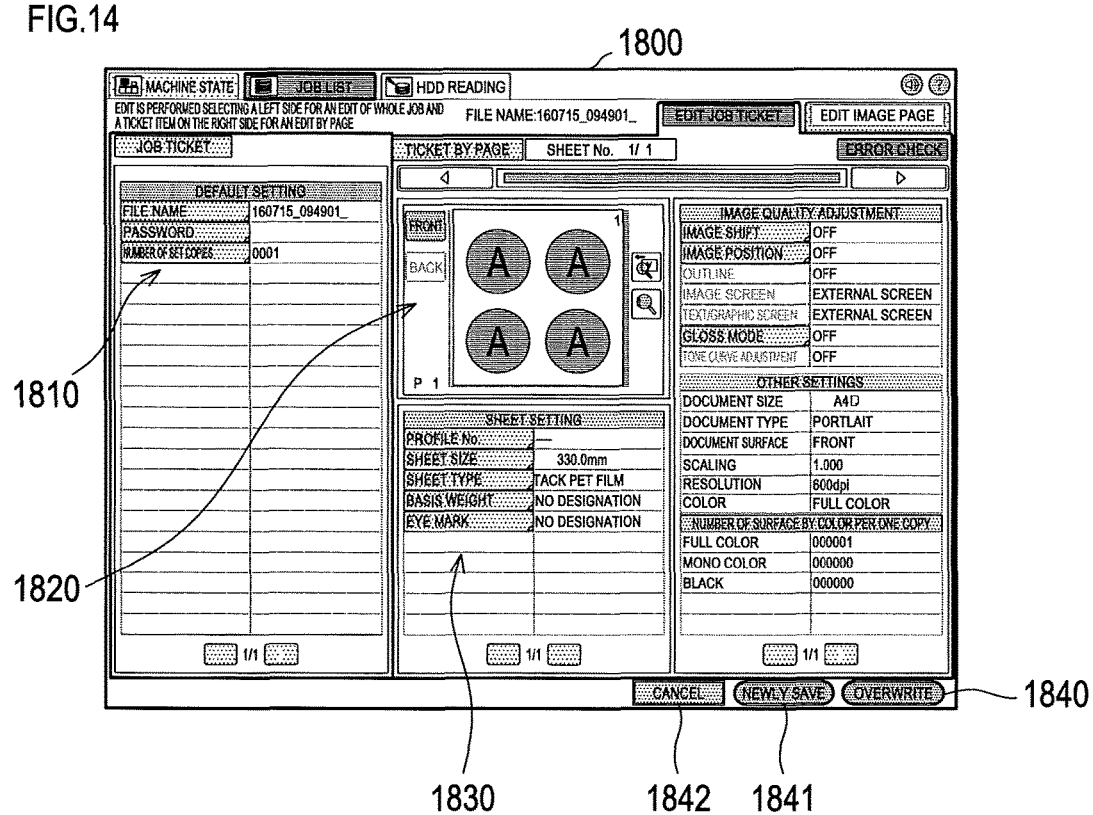
FIG. 14 similarly shows an operating screen for ticket edition.

FIG. 14 shows a ticket edition screen 1800. On the ticket edition screen 1800, the details of a job can be displayed or set. For example, in a default setting field 1810, the file name, the password, and the number of set copies can be displayed and entered.

Further, an image display field 1820 for additional printing is provided, and the specification of an eye mark is displayed and can be set in a sheet setting field 1830.

Figure 15:
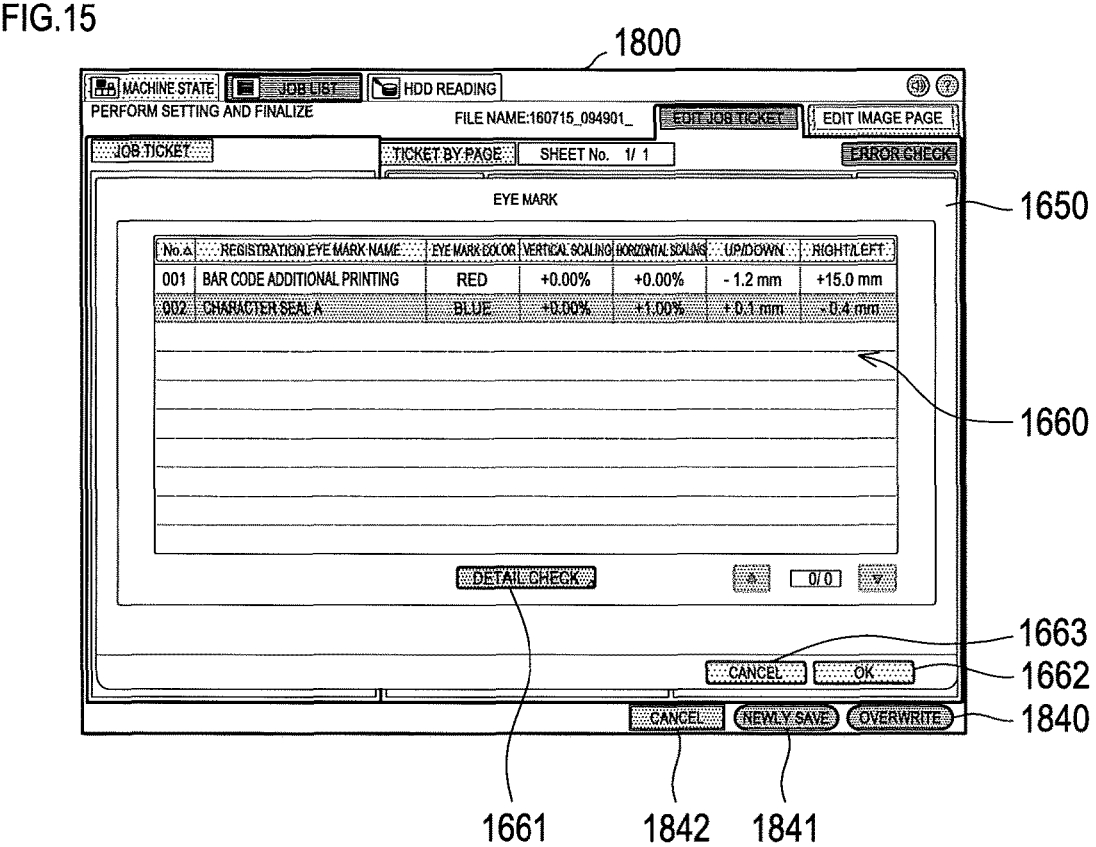
FIG. 15 similarly shows an operating screen showing the registered eye mark information.

Selecting and pressing the item indicating the specification of the eye mark pops up an eye mark registration screen 1650 on the ticket edition screen 1800 as shown in FIG. 15. Desired eye mark registration information can be selected from an eye mark registration list 1660 displayed on the eye mark registration screen 1650. Eye mark registration information contains the eye mark name, the eye mark color, and adjustment information, i.e., vertical scaling, horizontal scaling, the amount of vertical shift, and the amount of horizontal shift. Pressing a details check button 1661 displays a screen showing the details. Pressing an OK button 1662 with the registration field of an eye mark selected confirms selection of an eye mark, closes the eye mark registration screen 1650, reflects it to eye mark specification on the ticket edition screen, and associates a job and the eye mark with each other. Pressing a cancel button 1663 cancels selection of the eye mark.

On the ticket edition screen 1800, pressing an overwriting button 1840 confirms the contents of ticket edition and register them to the storage such that they are overwritten to the file with the same name. Pressing a newly saving button 1841 newly saves them with a file name according to default settings. If the same file name exists, a notification of the presence of the same file name or a suggestion of the change of the file name can show up. Pressing a cancel button 1842 cancels the edited contents.

Figure 16:
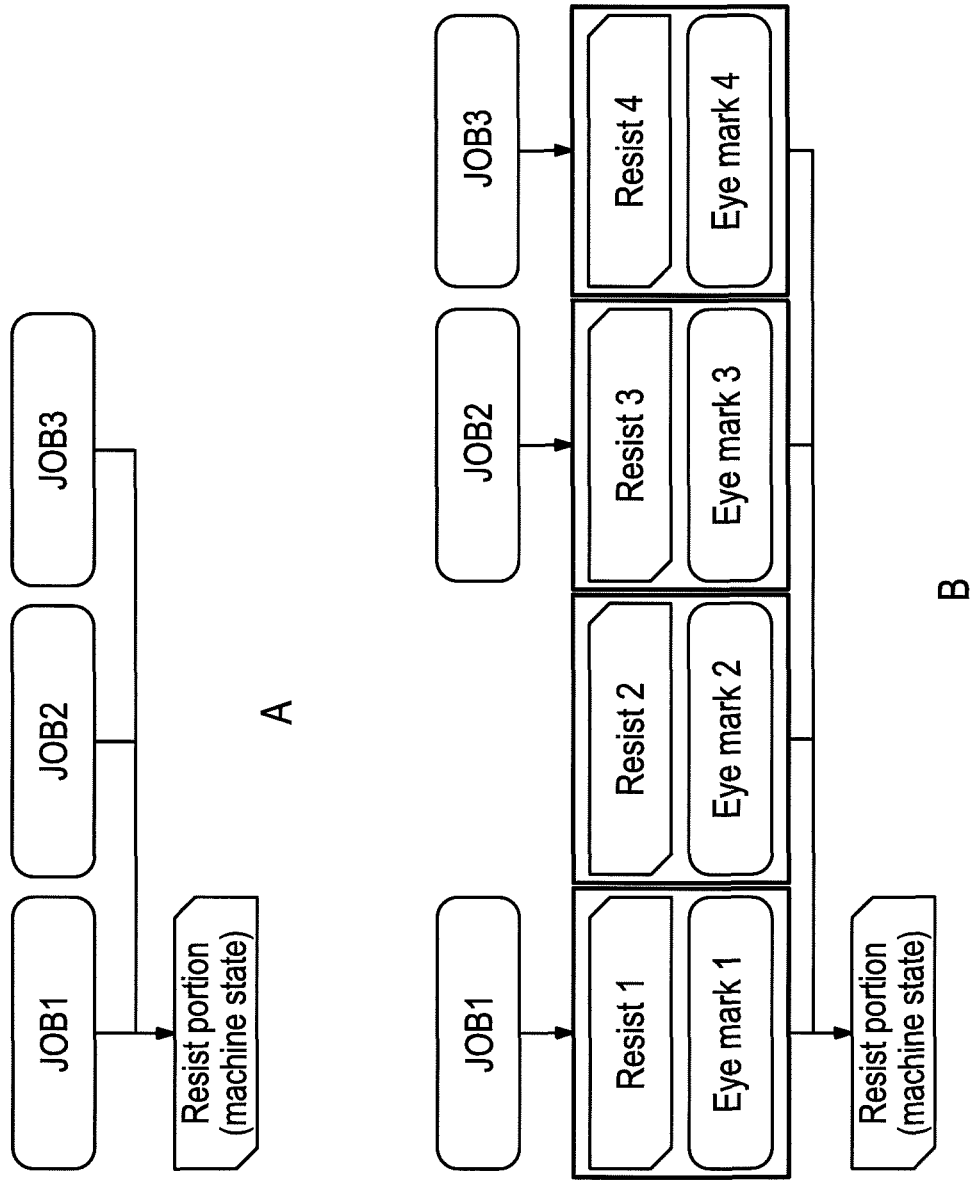
FIG. 16 is a diagram for explaining the states of job information and resist adjustment information stored.

FIG. 16 shows a relationship between adjustment information and each job. A diagram A in FIG. 16 shows the case where this embodiment is not employed and jobs are always printed reflecting only one resist adjustment value of machine state. Accordingly, the resist position is preferably set for each job.

A diagram B in FIG. 16 shows the case where this embodiment is employed, multiple registered eye marks and resist adjustment values exist, and a resist adjustment value of machine state can be recalled for each job and reflected for printing. As described above, a resist adjustment value can be associated with an eye mark for a job and, in printing, the associated resist adjustment value is reflected to the resist adjustment value of machine state and printing is performed.

With the above-described settings, additional printing is performed for each job according to adjustment information but there is the risk that an eye mark set for the job and the detected eye mark differ. For example, there are risks of an error in the order of jobs registered to a reserved list and of registration of a wrong job selected. The processing performed at the time will be explained.

Suppose that the following pre-printed sheet exists, for example.

100 circles of the eye mark 1, 40 circles of the eye mark 2, and 90 squares of the eye mark 3

Figure 17:
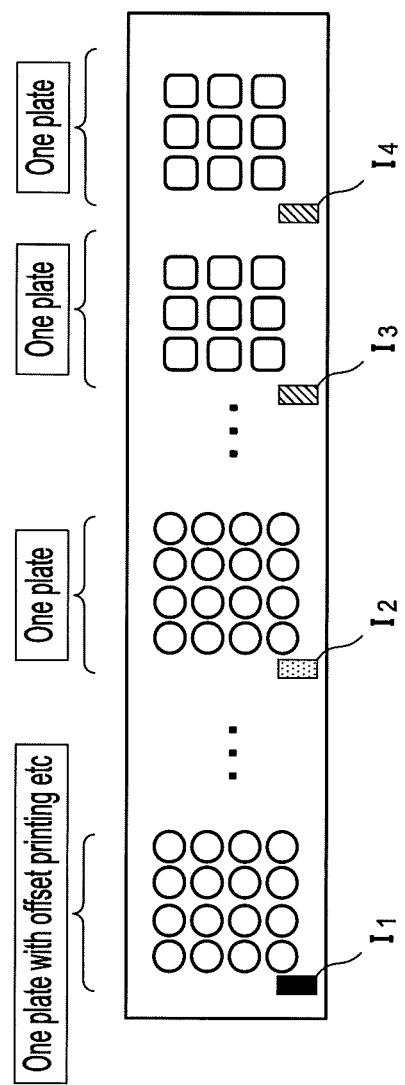
FIG. 17 is a diagram showing a transfer medium printed with alignment images and previous images according to multiple additional printing jobs, which is used in one embodiment of the present invention.

Assume that, as shown in FIG. 17, 100 copies of the letter A (JOB 1-associated with an eye mark I1) and 40 copies of the letter B (JOB 2-associated with an eye mark I2) should have been additionally printed in the circles, and 90 copies of the letter C (JOB 3-associated with an eye mark I3) should have been additionally printed in the squares on this pre-printed sheet in actual printing but only JOB 2 and JOB 3 were actually stacked on reservation by error.

The image forming device tries to print JOB 2 according to the settings but the image reader unit first detects the eye mark I1. JOB 2 is usually printed on the eye mark I1; however, in this embodiment, eye marks are distinguished from each other, so that it is not printed. At this time, an alarm of a mixture of a pre-printed sheet with a wrong eye mark can be given to the user.

Figure 18:
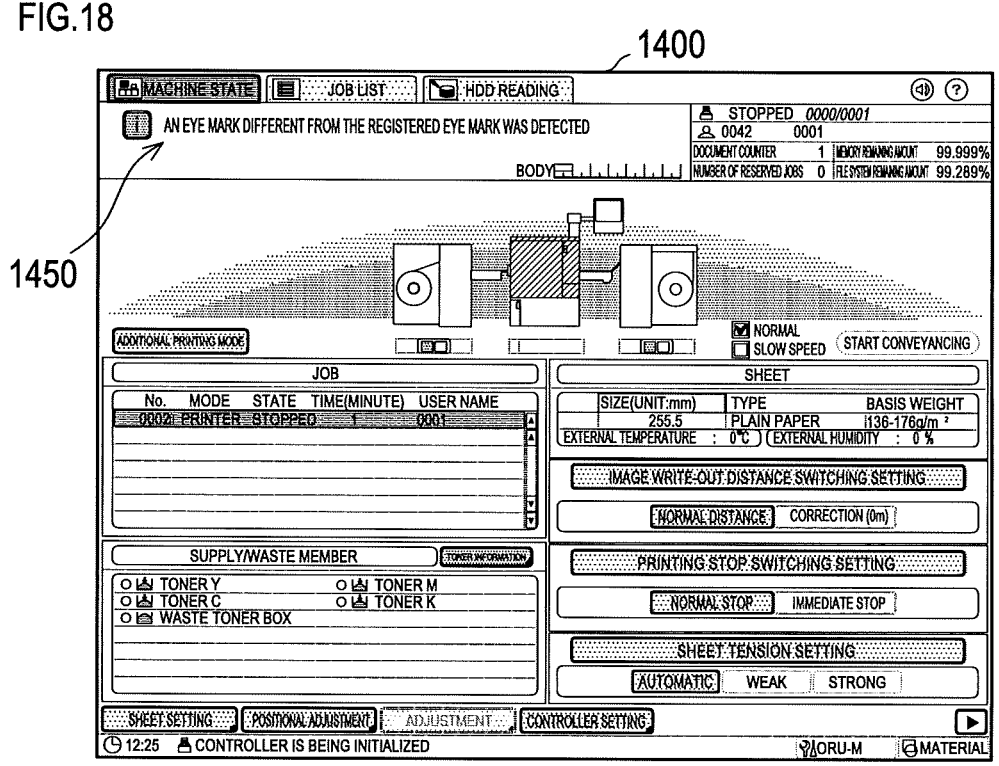
FIG. 18 similarly shows an operating screen on which an alarm is displayed when a set eye mark and a detected eye mark are different.

As shown in FIG. 18, displaying the message "an eye mark different from the registered eye mark was detected" on a display field 1450 of the machine setting screen 1400 can show, on the screen, that the eye mark is wrong.

Figure 19:
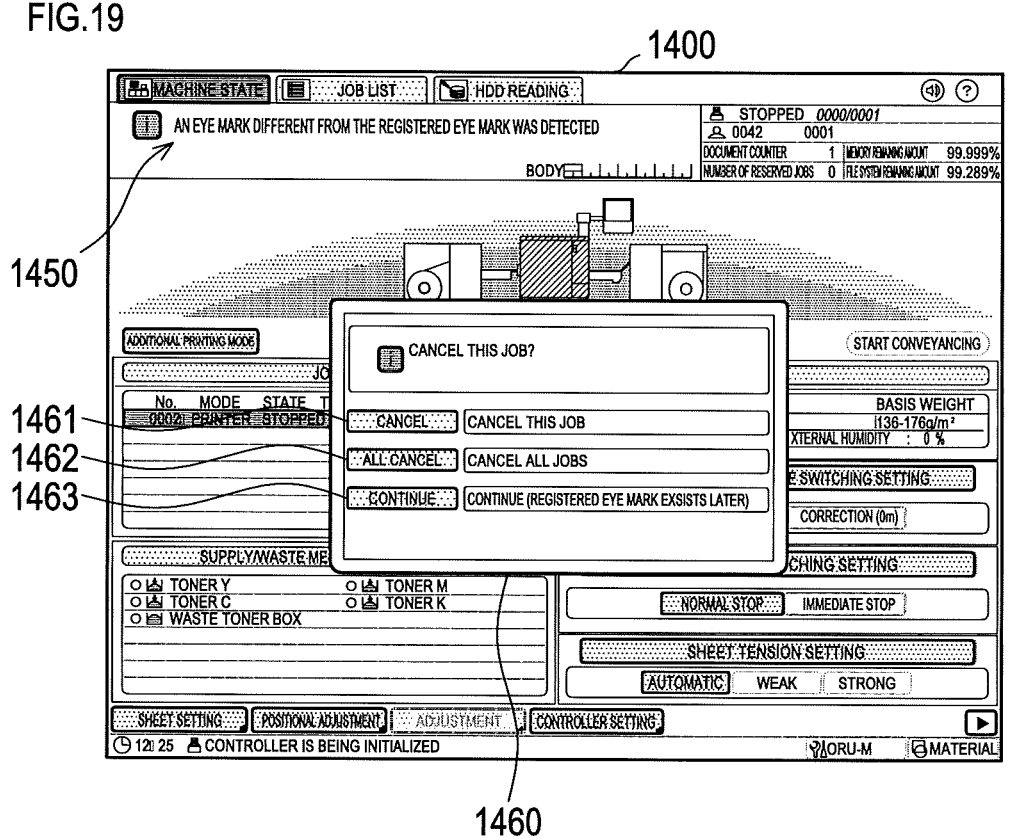
FIG. 19 similarly shows an operating screen on which a pop-up window for an inquiry of whether to stop printing for the job is displayed upon presentation of an alarm.

Further, in the event of detection of an eye mark different from the set eye mark, an inquiry about whether to cancel the job can be made. FIG. 19 shows a machine setting screen 1400 that pops up a job cancel inquiry screen 1460.

The job cancel inquiry screen 1460 shows a cancel button 1461, an all cancel button 1462, and a continue button 1463 in the manner that they can be pressed. Pressing the cancel button 1461 cancels printing of the printing target job. Pressing the all cancel button 1462 cancels printing of all jobs. Pressing the continue button 1463 continues printing of the job if the registered eye mark exists later. Conveyance of the transfer medium is continued until detection of the eye mark set at the time. Further, at the time, the distance of conveyance of the conveyed transfer medium or the distance of conveyance of the same while not being printed can be notified.

Figure 20:
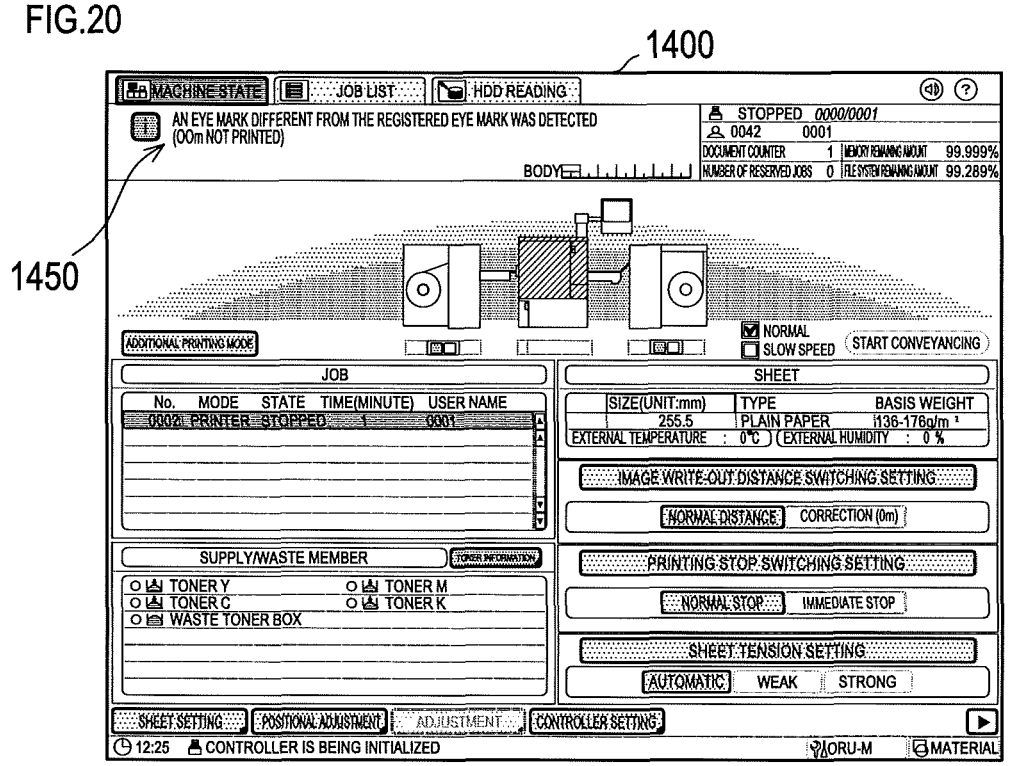
FIG. 20 similarly shows an operating screen showing an alarm and a conveyance distance.

On the machine setting screen 1400 in FIG. 20, with the message "an eye mark different from the registered eye mark was detected" in the display field 1450, after rolling is continued until an appropriate eye mark comes, the message showing how many meters of conveyance has been made until an appropriate eye mark came or how many meters of blank has been made without printing can be displayed. For example, during continuous printing, if the user is notified how many meters of blank part without printing has been conveyed, the user can find whether it is intended.

Although an alarm notification or a notification of the printing distance of the transfer medium is displayed on the operating unit 140 in the above description, there is no limitation on the way of notification and it can be made through a sound or the like or transmitted to an external device via a network. The external device can give an alarm or the like through presentation on a screen or a sound.

As described above, according to this embodiment, the image forming device for printing a continuous transfer medium can set multiple pre-printed detection marks (eye marks) for additional printing and register resist adjustment for each. An eye mark can be associated with a job, and an alarm of a mismatch between a set eye mark and a detected eye mark can be displayed on a screen.

Although additional printing is controlled by the control unit included in the image forming device in the above-described embodiment, additional printing can be performed with the image forming device controlled by a control unit in an external device.

In other words, according to this embodiment, multiple alignment images can be distinguished from each other and an additional image according to each alignment image can be printed in an appropriate position.

Although the present invention has been described based on the above-described embodiment, the scope of the present invention is not limited to the above description and any appropriate modification of the above-described embodiment can be made without departing from the scope of the present invention.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming device that performs printing, comprising:
    a storage that stores information about a plurality of alignment images printed on a transfer medium;
    an image forming unit that prints a first additional image and a second additional image on the transfer medium, the first additional image being different from the second additional image;
    a reader unit that reads the alignment image printed on the transfer medium on an upstream side of the image forming unit along the transfer direction of the transfer medium; and
    a control unit that distinguishes multiple alignment images upon reception of reading results from the reader unit, wherein
    the control unit performs control of storing adjustment information for adjusting the positions of the first and second additional images to be formed, according to multiple alignment images, in the storage, and
    the control unit performs control of associating, with each alignment image, a respective job for printing to cause the image forming unit to print the first additional image a plurality of times and then to print the second additional image a plurality of times.

2. The image forming device according to claim 1, wherein the control unit causes each adjustment information to be associated with a respective alignment image and stores the adjustment information associated with the respective alignment image in the storage.

3. The image forming device according to claim 1, wherein the control unit detects the alignment images upon reception of reading results from the reader unit.

4. The image forming device according to claim 1, wherein the control unit allows the adjustment information to be acquired from a print additionally printed according to detection of the alignment images.

5. The image forming device according to claim 4, wherein the control unit allows the adjustment information to be acquired from a print printed with a predetermined number of additional printing.

6. The image forming device according to claim 1, wherein the control unit determines, in additional printing, the positions of the first and second additional images to be formed, according to the results of detection of the alignment images and the adjustment information read from the storage based on the results of distinguishing between the multiple alignment images, and prints the first and second additional images on the transfer medium.

7. The image forming device according to claim 6, wherein the control unit determines the positions of the first and second additional images to be formed, according to an image forming timing.

8. The image forming device according to claim 1, wherein information about the alignment images includes a default value of the positions of the first and second additional images to be formed that is dependent on the alignment images.

9. The image forming device according to claim 8, wherein the adjustment information relates to the amount of deviation of the first and second additional images from the default value.

10. The image forming device according to claim 1, wherein the control unit distinguishes the multiple alignment images by one or two or more of color, size, and shape.

11. The image forming device according to claim 1, wherein, during additional printing on a job associated with an alignment image of the alignment images, the control unit gives an alarm in the event of a mismatch between the alignment image set for the job and the alignment image read by the reader unit.

12. The image forming device according to claim 11, wherein the control unit indicates existence of a wrong alignment image when giving the alarm.

13. The image forming device according to claim 11, wherein the control unit makes an inquiry about whether to cancel the job when giving the alarm.

14. The image forming device according to claim 1, wherein while a job for additional printing is executed, the control unit continues conveyance of the transfer medium until the reader unit detects the alignment image associated with the job, and notifies the distance of the conveyance of the transfer medium.

15. The image forming device according to claim 14, wherein the distance of the conveyance of the transfer medium notified by the control unit includes the distance of conveyance lasting until detection of the alignment image associated with the job and/or the distance of conveyance unaccompanied by printing and lasting until detection of the alignment image associated with the job.

\* \* \* \* \*